US008375074B2

(12) United States Patent
Kato et al.

(10) Patent No.: US 8,375,074 B2
(45) Date of Patent: Feb. 12, 2013

(54) DEVICE AND PROGRAM FOR CIPHERING DATA

(75) Inventors: Hiromitsu Kato, Yokohama (JP); Eriko Ando, Yokohama (JP); Yasuko Fukuzawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1318 days.

(21) Appl. No.: 11/739,120

(22) Filed: Apr. 24, 2007

(65) Prior Publication Data

US 2008/0028012 A1    Jan. 31, 2008

(51) Int. Cl.
*G06F 1/02* (2006.01)

(52) U.S. Cl. .......................... 708/250; 380/44; 380/278

(58) Field of Classification Search ........... 708/250–256
See application file for complete search history.

(56) References Cited

U.S. PATENT DOCUMENTS

| | | | | |
|---|---|---|---|---|
| 5,068,894 A * | 11/1991 | Hoppe | ..................... | 708/250 |
| 5,365,225 A * | 11/1994 | Bachhuber | ................... | 340/5.26 |
| 5,414,650 A * | 5/1995 | Hekhuis | ................. | 708/203 |
| 5,438,622 A * | 8/1995 | Normile et al. | ............... | 708/250 |
| 6,061,789 A * | 5/2000 | Hauser et al. | ................. | 713/168 |
| 6,728,740 B2 * | 4/2004 | Kelly et al. | ................... | 708/250 |
| 7,299,355 B2 * | 11/2007 | Qi | ................... | 708/252 |
| 7,660,414 B2 * | 2/2010 | Suzuki | ................. | 708/250 |
| 7,769,165 B2 * | 8/2010 | Jakubowski et al. | ........ | 708/250 |
| 2003/0069910 A1 * | 4/2003 | Kelly et al. | ................... | 708/250 |
| 2004/0267847 A1 * | 12/2004 | Harper | ................... | 708/250 |
| 2007/0174374 A1 * | 7/2007 | Inoha | ................... | 708/252 |
| 2007/0244951 A1 * | 10/2007 | Gressel et al. | ................ | 708/252 |

FOREIGN PATENT DOCUMENTS

| | | |
|---|---|---|
| JP | 10-247140 | 9/1998 |
| JP | 11-237837 | 8/1999 |
| JP | 2001-005383 | 1/2001 |
| JP | 2005-278007 | 10/2005 |

* cited by examiner

*Primary Examiner* — Michael D Yaary
(74) *Attorney, Agent, or Firm* — Antonelli, Terry, Stout & Kraus, LLP.

(57) ABSTRACT

A terminal to be connected to a network has: a data acquisition unit for acquiring first data from the network; an extraction unit for extracting second data regarding a physical quantity in accordance with the first data; a random number generation unit for generating a random number in accordance with the second data; and an enciphering unit for enciphering the first data in accordance with the random number. The terminal has further a counter unit for counting the number of the first data, wherein the random number generation unit generates a random number in accordance with the second data or a value counted by the counter unit.

12 Claims, 5 Drawing Sheets

FIG. 4

| TO BE COLLECTED CAN ID |
|---|
| 123 |
| 2B1 |
| 021 |
| 596 |
| 7D4 |
| --- |

FIG. 5

| 501 | 502 | 503 | 504 | 505 |
|---|---|---|---|---|
| CAN ID | CTL | DATA FIELD | CRC | ACK |

FIG. 6

| 601 | 501 | 602 | 603 | 604 |
|---|---|---|---|---|
| NAME | CAN ID | BIT POSITION | DATA LENGTH | CONVERSION FORMULA |
| ENGINE SPEED | 123 | 7 | 8 | F1 |
| YAW RATE | 3A7 | 1 | 10 | F2 |
| ACCELERATION RATE | 692 | 35 | 8 | F3 |
| STEERING ANGLE | 2F9 | 24 | 8 | F4 |
| FUEL INJECTION QUANTITY | 38D | 8 | 4 | F5 |
| TARGET TORQUE VALUE | 045 | 59 | 4 | F6 |
| --- | --- | --- | --- | --- |

FIG. 7

| ENGINE SPEED | TIME STAMP |
|---|---|
|  |  |
|  |  |
|  |  |
| ---- | --- |

| YAW RATE | TIME STAMP |
|---|---|
|  |  |
|  |  |
|  |  |
| ---- | --- |

| ACCELERATION RATE | TIME STAMP |
|---|---|
|  |  |
|  |  |
|  |  |
| ---- | --- |

| STEERING ANGLE | TIME STAMP |
|---|---|
|  |  |
|  |  |
|  |  |
| ---- | --- |

| CAN DATA | TIME STAMP |
|---|---|
|  |  |
|  |  |
|  |  |
| ---- | --- |

DEVICE AND PROGRAM FOR CIPHERING DATA

BACKGROUND OF THE INVENTION

The present invention relates to a vehicle-mounted terminal for generating a cipher key for security protection.

Electronization of vehicle-mounted terminals has progressed in the field of vehicles because of an increased demand for safety, good environments and ease of use. For example, a hybrid car mounts not only a conventional gasoline engine but also an electronic motor and an inverter which are important electronic components cooperating with the gasoline engine. In-vehicle networks such as a controller area network (CAN) and a local interconnect network (LIN) are also prevailing in order to realize cooperation between electronic control units (ECUs) for controlling vehicle electronic components. Use of VRM terminals is expanding which terminals are used for collecting vehicle information via an in-vehicle network and storing the vehicle information in a storage medium such as a memory and a hard disc drive (HDD), in order to confirm thereafter trouble information and event information. VRM (an acronym for vehicle relationship management) is a technique of increasing an added value of a vehicle by providing new services such as remote maintenance by collecting, accumulating and utilizing vehicle information.

If vehicle information relates to vehicle control/diagnosis and driver behavior, security of collected data is often required so that ciphering is necessary for security protection. In order to retain sufficient safety, a general information system generates dynamically at each site a random number as a cipher key. It is known that a random number includes an "arithmetic random number (pseudo random number)" obtained from a predetermined algorithm and a "physical random number" obtained from physical phenomena.

As a technique of generating an arithmetic random number, JP-A-10-247140 describes a technique that a bit string generated by a 16-bit free-running counter is sequentially shifted by 16 bits to right and a new freerun count is loaded to left end 16 bits to thereby generate a long random number with small scale hardware. As a technique of generating a physical random number, JP-A-2001-005383 describes a technique that a random number is generated from an output value of a temperature sensor unable to be predicted from an external.

SUMMARY OF THE INVENTION

In generating an "arithmetic random number" according to JP-A-10-247140, since there is a case in which the same random number is generated from the same initial value, it is necessary to change the initial value each time by a freerun counter or the like. Since the counter itself has periodicity, a random number to be generated can be predicted by collecting output random numbers. Namely, if a random number difficult to be estimated from an outsider is to be generated by this method, it is necessary to use a random number generation method having a complicated procedure, raising cost for realizing this method.

In generating a "physical random number" according to JP-A-2001-005383, it is necessary to add a sensor for capturing physical phenomenon, raising cost.

An object of the present invention is to provide an apparatus capable of generating a random number difficult to be estimated by an outsider, without adding an apparatus such as a sensor.

A terminal of the present invention to be connected to a network comprises: a data acquisition unit for acquiring first data from the network; an extraction unit for extracting second data regarding a physical quantity in accordance with the first data; a random number generation unit for generating a random number in accordance with the second data; and an enciphering unit for enciphering the first data in accordance with the random number.

According to the present invention, it is possible to provide an apparatus capable of generating a random number difficult to be estimated by an outsider, without adding an apparatus such as a sensor.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing a list of CAN IDs.

FIG. 5 is a diagram showing the structure of CAN data.

FIG. 6 is a table from which vehicle data is extracted.

FIG. 7 is a table in an information management unit.

DESCRIPTION OF THE EMBODIMENT

With reference to the accompanying drawings, description will be made on a method of generating a key to be used for enciphering vehicle information collected by a vehicle-mounted terminal. The vehicle-mounted terminal means a terminal mounted on a vehicle, and includes a VRM terminal and ECUs. Vehicle information indicates physical quantity data such as an engine speed, a yaw rate, an acceleration rate, a steering angle, a fuel injection quantity and a target torque value. The engine speed, yaw rate, acceleration rate, steering angle and fuel injection quantity are running information indicating a running state of the vehicle. The target torque value is vehicle control information. The running information and control information is information changing from time to time as the vehicle runs.

Figure 1:
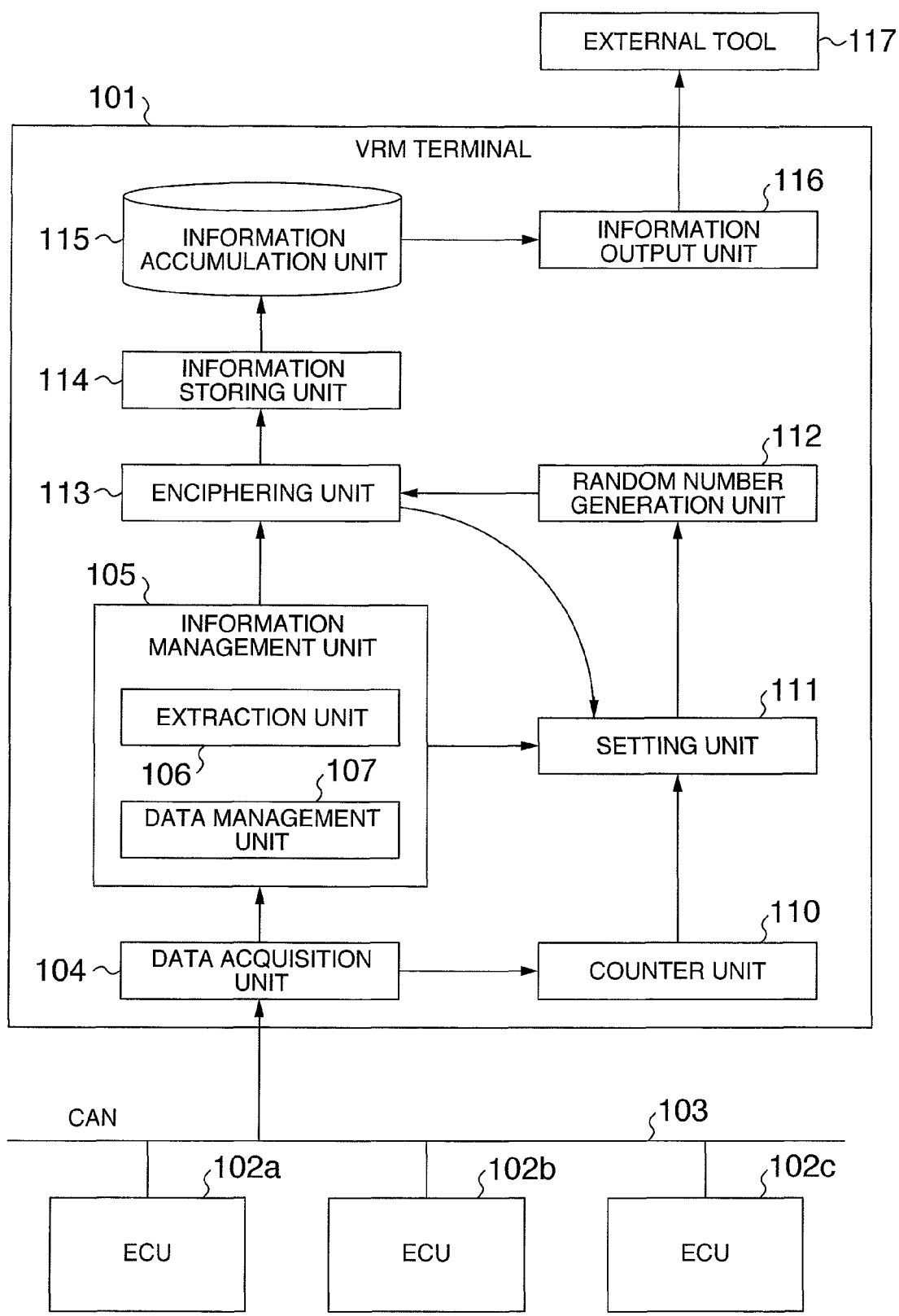
FIG. 1 is a functional block diagram of a vehicle system to which the present invention is applied.

FIG. 1 is a diagram showing functional blocks of a vehicle system.

A VRM terminal 101 collects information exchanged between an ECU 102a to an ECU 102c via a control network which ECUs control vehicle components (such as an engine and a brake of the vehicle). In this example, although the control network is assumed to be CAN, it is not limited only thereto. The control network interconnects apparatus (such as ECU) in the vehicle.

A data acquisition unit 104 acquires CAN data packing vehicle information flowing on CAN 103, and temporarily stores it in a data management unit 107 of an information management unit 105. The data management unit 107 stores vehicle information extracted from the CAN data. A counter unit 110 counts the number of acquired data (packets). An extraction unit 106 of the information management unit 105 extracts vehicle information from the CAN data stored in the data management unit 107. An information storing unit 114 stores the CAN data stored in the data management unit 107 in an information accumulation unit 115 for a long period of time. An enciphering unit 113 acquires as a cipher key a random number generated by a random number generation unit 112, and by using this cipher key, enciphers the CAN data stored in the data management unit 107. The random number generation unit 112 generates a random number in accordance with a value (hereinafter called a random number seed) set by a setting unit 111. An information output unit 116 outputs information accumulated in the information accumulation unit 115 to an external tool 117.

Figure 2:
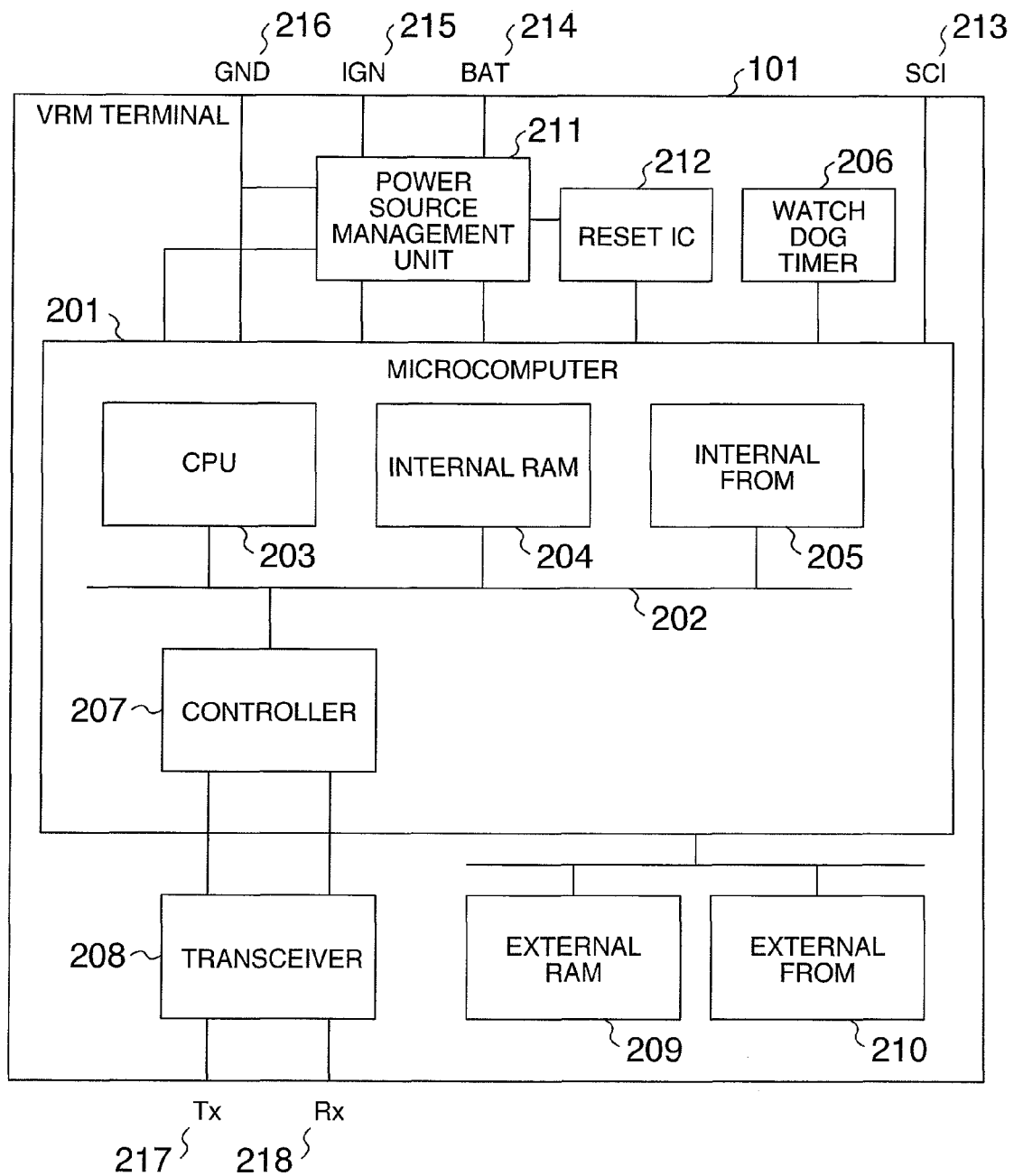
FIG. 2 is a diagram showing the structure of hardware of a VRM terminal.

FIG. 2 is a diagram showing the structure of hardware of the VRM terminal. The VRM terminal 101 is constituted of: a microcomputer (hereinafter abbreviated to MC) 201; a power source management unit 211 for managing a power source; a reset IC 212 for outputting a reset signal to MC 201 when a power source voltage lowers; a watch dog timer 206 for generating a reset signal upon a system runaway during monitoring a system clock; a battery (BAT) interface 214; an ignition switch (IGN) interface 215; a transceiver 208 as a physical input/output interface for transmission/reception relative to CAN 103; a controller 207 for processing CAN data as digital information; an external RAM 209 and an external FROM (flash ROM). In the transceiver 208, a transmitter (Tx) 217 transmits a signal to CAN 103, and a receiver (Rx) 218 receives a signal from CAN 103. The power source management unit 211 receives power from the battery (BAT) interface 214 when an IGN signal from the ignition switch (IGN) interface 215 is ON. An earth (GND) 216 is connected, for example, to a vehicle body, serving as a reference voltage point of the VRM terminal 101.

MC 201 is constituted of a CPU 203, an internal RAM 204, an internal FROM 205 and an internal bus 202 interconnecting these constituent elements.

CPU 203 loads a program stored in the internal FROM 205 (or external FROM 210) into the internal RAM 204 (or external RAM 209) to conduct processing.

The internal RAM 204 (or external RAM 209) stores data shown in FIGS. 4, 6 and 7 to be described later, and has a role of the information storing unit 114.

The internal FROM 205 (or external FROM 210) stores programs having the functions of the data acquisition unit 104, information management unit 105 (including the extraction unit 106 and data management unit 107), enciphering unit 113, information storing unit 114, counter unit 110, setting unit 111, random number generation unit 112, information output unit 116 and the like described with reference to FIG. 1, and also has a role of the information accumulation unit 115. A RAM and an FROM of large capacity may be built in without using the external RAM and FROM.

The VRM terminal 101 and external tool 116 conduct communications via a serial communication interface (SCI) 213, or may conduct communications via CAN 103.

The functions described with reference to FIG. 1 may be realized by hardware. Programs for realizing these functions may be transferred from a storage medium such as a CD-ROM or may be downloaded from another apparatus via the network.

Figure 3:
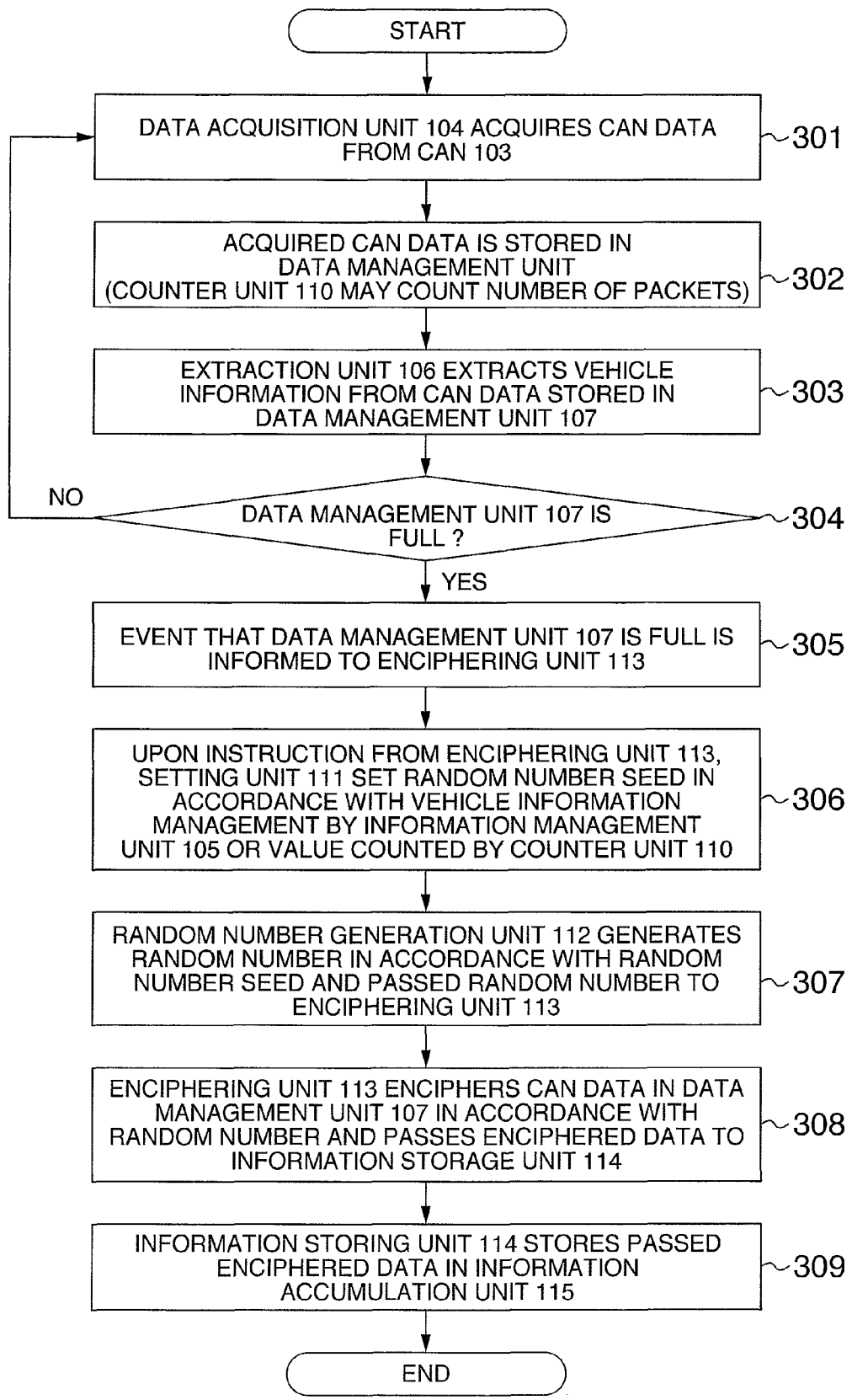
FIG. 3 is a flow chart illustrating an operation of enciphering collected data.

FIG. 3 is a flow chart illustrating a process of enciphering collected vehicle information and accumulating it. In the following, although description will be made as if the functional blocks described with reference to FIG. 1 are hardware (as if the functional blocks are processing subjects), it is needless to say that the subject for realizing the functions by software is CPU 203 for executing programs.

First, the data acquisition unit 104 acquires collection target CAN data from CAN 103 (Step 301). A list of CAN data to be collected is registered in advance in the data acquisition unit 104. An example of a collection data list is shown in FIG. 4. As shown in FIG. 5, CAN data is constituted of a CAN ID 501, a CTL 502, a data field 503, a CRC 504 and an ACK 505. CAN ID 501 is an identifier for identifying CAN data. CTL 502 is information for controlling CAN data. The data field 503 is a core portion storing actual control information. CRC 504 is error detection code, and ACK 505 is delivery confirmation information. The list shown in FIG. 4 lists up CAN IDs 501 of CAN data to be collected.

Next, the data acquisition unit 104 temporarily stores the acquired CAN data in the data management unit 107 (Step 302). At this time, the counter unit 110 may count the number of CAN data (packets). The data management unit 107 buffers the whole CAN data with time stamps of a designated data capacity (e.g., 10 MB).

Next, the extraction unit 106 extracts vehicle information from the CAN data stored in the data management unit 107 (Step 303). Specifically, a corresponding bit string is picked up from the data field 503, this bit string is input to a predetermined conversion formula, and the resultant output is used as vehicle information. FIG. 6 shows an example of a reference table to be used for extracting vehicle information from CAN data. This table is constituted of: a name 601 indicating a type of vehicle information; a CAN ID 501 for identifying a type of vehicle information; a bit position 602 indicating the start of data; a data length 603 indicating a length of the whole data; and a conversion formula 604 for inputting an obtained bit string and outputting an actual physical quantity. For example, in order to acquire an "engine speed", CAN data having CAN ID 501 of "123" is acquired, and a bit string is acquired which is 8 bits from the 7-th bit from the start of the data field 503. This bit string is input to the conversion formula 604, and the obtained data is used as the "engine speed". The information management unit 105 affixes a time stamp indicating a time when the CAN data is acquired, to the acquired vehicle information, and manages a history of the predetermined number of CAN data (e.g., 10 packets). FIG. 7 is an internal data table of the information management unit 105, the table indicating collection results of CAN data.

Next, it is judged whether a capacity of the data management unit 107 for storing CAN data is full (Step 304), and if full, this event is informed to the enciphering unit 113 (Step 305). If not full, the flow returns to Step 301. A threshold value may be set to the capacity, and if the capacity exceeds the threshold value, this event is informed. The event may be informed at other timings. Alternatively, the event may be informed directly to the setting unit 111 without involvement of the enciphering unit 113.

Next, upon reception of the event, the enciphering unit 113 instructs the setting unit 111 to set a random number seed. The setting unit 111 sets a value (e.g., the latest value) whose history is managed by the information management unit 105 to the random number seed. In this case, a value counted by the counter unit 110 may be set. The random number seed may be set as either the value whose history is managed by the information management unit or the value counted by the counter unit 110 (Step 306). Thereafter, the setting unit 111 passes the set random number seed to the random number generation unit 112.

The random number generation unit 112 generates a random number in accordance with the random number seed passed from the setting unit 111, and passes as a cipher key a random number of 128 bits to the enciphering unit 113 (Step 307). A method of generating a random number from a random number seed may be a method of using a random number generation function (argument is the random number seed) prepared as a library of a general programming language such as C and Java (registered trademark).

The enciphering unit 113 acquires the CAN data from the data management unit 107, enciphers the CAN data by using the cipher key passed from the random number generation unit 112, and passes the enciphered data to the information storing unit 114 (Step 308). The CAN data to be enciphered may be the CAN data which was used as a generation basis of the cipher key, or may be the CAN data which was not used as a generation basis of the cipher key. Thereafter, the information storing unit 114 stores the enciphered data in the information accumulation unit 115 (Step 309). As the enciphering algorithm, a common key enciphering algorithm such as AES used as standards may be used. A cipher key used for enciphering is enciphered by using a public key designated beforehand and additionally stored in the information accumulation unit 115. A unit combining the functions of the random number generation unit 112 and setting unit 111 may be used as a random number generation unit. The enciphered data stored in the information accumulation unit 115 may be output to the external tool 117 from the information output unit 116 when the VRM terminal 101 is connected to the external tool 117. The external tool 117 may have a deciphering algorithm corresponding to the enciphering algorithm and the reference table (FIG. 6) to be used for extracting vehicle information from CAN data.

According to the embodiment, as a seed for random number generation (random number seed), not a preset value but vehicle information matching the operation state of a vehicle-mounted terminal is used. It is therefore difficult for an outsider to obtain information on a random number seed from the outside of the vehicle-mounted terminal and estimate the cipher key as a random number. Even if a copy of the vehicle-mounted terminal is formed because of external leak of the specifications of the vehicle-mounted terminal and the identify-theft terminal is connected to the same network as that of the real vehicle-mounted terminal, a probability of estimating a cipher key can be made very low because the random number seed is randomly selected from a plurality of seed candidates.

Although the vehicle-mounted terminal has been described, it is obvious that the present invention is applicable to terminals other than the vehicle-mounted terminal. For example, information on semiconductor manufacture apparatus is monitored in order to improve a manufacture yield. In this case, by installing the terminal of the embodiment in semiconductor manufacture apparatuses, it is possible to collect information on the semiconductor manufacture apparatuses with high security protection, similar to vehicles. In this case, information to be collected is physical quantity data such as a liquid chemical discharge pressure, a gas supply pressure, a motor revolution speed and a vacuum degree.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A terminal coupled to an object, comprising:
a data acquisition unit for acquiring data of the object, as a packet;
a counter unit for counting a number of packets obtained by the data acquisition unit;
an extraction unit for obtaining a data value indicating an operation status of the object by extracting a bit string from the packet, and converting the bit string to the data value;
a random number generation unit for generating a random number by selecting one of the number of packets counted by the counter unit and the data value obtained by the extraction unit as a seed;
an enciphering unit for enciphering the packet by using the random number; and
a reference table including a type and identifier of the packet, a start point and length of the bit string, and a conversion formula used for converting the bit string to the data value, wherein:
the extraction unit extracts the bit string by referring to the identifier, the start point and the length, and converts the bit string with the conversion formula.

2. The terminal according to claim 1, wherein the data acquisition unit holds an ID list of identifiers each of which identifies data of the object to be acquired, and acquires the data of the object identified by the identifiers in the ID list.

3. The terminal according to claim 1, wherein
plural data values obtained by the extracting unit are maintained in a list; and
the random number generation unit selects one data value randomly from the list as the seed to generate the random number.

4. The terminal according to claim 1, wherein the object is a vehicle.

5. The terminal according to claim 4, wherein the vehicle has a plurality of devices, each of which sends the data to be acquired by the acquisition unit to the terminal.

6. The terminal according to claim 4, wherein the data value is at least one of engine speed, yaw rate, acceleration rate, steering angle and fuel injection quantity of the vehicle.

7. A non-transitory computer-readable medium embodying a computer program for effecting an encrypting operation, the program, when implemented, effecting operations comprising:
acquiring data of the object, as a packet;
counting a number of packets obtained by the acquiring operation;
obtaining a data value indicating an operation status of the object by extracting a bit string from the packet, and converting the bit string to the data value;
generating a random number by selecting one of the number of packets counted by the counting operation and the data value obtained by the extracting operation as a seed;
enciphering the packet by using the random number; and
maintaining a reference table including a type and identifier of the packet, a start point and length of the bit string, and a conversion formula used for converting the bit string to the data value;
wherein the extracting operation extracts the bit string by referring to the identifier, the start point and the length, and converts the bit string with the conversion formula.

8. The non-transitory computer-readable medium according to claim 7, comprising the acquiring operation references a stored ID list of identifiers, each of which identifies data of the object to be acquired, and acquires the data of the object identified by the identifiers in the ID list.

9. The non-transitory computer-readable medium according to claim 7, with the program effecting further operations comprising:
maintaining plural data values obtained by the extracting operation in a list; and
selecting at least one data value randomly from the list as the seed to generate the random number.

10. The non-transitory computer-readable medium according to claim 7, wherein the object is a vehicle.

11. The non-transitory computer-readable medium according to claim 10, wherein the vehicle has a plurality of devices, each of which provides the data to be acquired by the acquiring operation to the terminal.

12. The non-transitory computer-readable medium according to claim 10, wherein the data value is at least one of engine speed, yaw rate, acceleration rate, steering angle and fuel injection quantity of the vehicle.

* * * * *